US010642706B2

United States Patent
Compton et al.

(10) Patent No.: US 10,642,706 B2
(45) Date of Patent: May 5, 2020

(54) DETECTION AND RECOVERY OF LOST HOST ENABLED FACILITIES

(71) Applicant: International Business Machines Corporation, Armonk, NY (US)

(72) Inventors: Scott B. Compton, Hyde Park, NY (US); Dale F. Riedy, Poughkeepsie, NY (US); William C. Shepard, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 292 days.

(21) Appl. No.: 15/214,584

(22) Filed: Jul. 20, 2016

(65) Prior Publication Data

US 2018/0024902 A1 Jan. 25, 2018

(51) Int. Cl.
*G06F 11/30* (2006.01)
*G06F 11/00* (2006.01)

(52) U.S. Cl.
CPC .......... *G06F 11/3048* (2013.01); *G06F 11/00* (2013.01); *G06F 11/3034* (2013.01)

(58) Field of Classification Search
CPC .......................... G06F 11/3048; G06F 11/3034
See application file for complete search history.

(56) References Cited

U.S. PATENT DOCUMENTS

| 6,185,638 B1* | 2/2001 | Beardsley ............. G06F 13/387 710/3 |
| 6,202,095 B1* | 3/2001 | Beardsley ............. G06F 9/5044 709/201 |
| 6,990,536 B2 | 1/2006 | Vishlitzky et al. |
| 7,840,717 B2 | 11/2010 | Flanagan et al. |

(Continued)

FOREIGN PATENT DOCUMENTS

CN     101369258 B     12/2010

OTHER PUBLICATIONS

Suzuki, et al., "Disaggregation and Sharing of I/O Devices in Cloud Data Centers"; Journal of Latex Class Files, vol. PP, Issue:99, May 2015; 14 pages.

(Continued)

*Primary Examiner* — Tim T Vo
*Assistant Examiner* — Herve Iradukunda
(74) *Attorney, Agent, or Firm* — Cantor Colburn LLP; William Kinnaman

(57) ABSTRACT

A method, system, and computer program product are provided for determining whether a control unit for an attached device has lost knowledge of a supported host enabled facility associated with the attached device. I/O instructions are initiated that include a first instruction to determine whether the control unit currently has knowledge of the host enabled facility and a second instruction providing knowledge of the host enabled facility by the control unit. Based on responses from the control unit to the I/O instructions, it is determined whether the control unit has (Continued)

transitioned from not having knowledge of the host enabled facility to having such access. If it is determined that the control unit has made such transition as a result of the sequence of I/O instructions, parameters for use with the host enabled facility are initialized; otherwise, such initialization is prevented.

20 Claims, 2 Drawing Sheets

(56) References Cited

U.S. PATENT DOCUMENTS

| | | | |
|---|---|---|---|
| 8,069,364 B2 | 11/2011 | Coronado et al. | |
| 8,549,185 B2 | 10/2013 | Candelaria et al. | |
| 2008/0104354 A1* | 5/2008 | Cammarata | G06F 3/0605 711/170 |
| 2009/0210561 A1* | 8/2009 | Ricci | G06F 13/122 710/5 |
| 2015/0269117 A1* | 9/2015 | Gainey, Jr. | G06F 9/4403 713/2 |

OTHER PUBLICATIONS

Waldspurger, et al.. "Decoupling a logical device from its physical implementation offers many compelling advantages."; Communications of the ACM, Aol. 55, No. 1, Jan. 2012, 7 pages.

* cited by examiner

DETECTION AND RECOVERY OF LOST HOST ENABLED FACILITIES

BACKGROUND

An I/O control unit (CU), such as used to control the operation of a direct-access storage device (DASD) or other devices, can provide optional facilities that require specific host system support and are therefore enabled by the host system. These Host Enabled Facilities (HEFs) are enabled when the host system communicates them to the CU over the I/O interface. Certain CU or path-related events can cause the CU to lose its knowledge of a HEF, which requires the host system to communicate it to the CU again.

One typical problem caused by such loss may be that the host system may not be aware that the CU has lost knowledge of the HEF. The CU does not notify the host system when this condition occurs. Because this condition occurs infrequently, it would be inefficient for the host to poll the CU for this condition.

The impact of the CU losing knowledge of the HEF can be significant, at least because this may cause the CU to "turn off" the facility. The host system not only must re-enable the HEF it supports, but may need to recover from resulting error conditions and redo any initialization processes required for using the HEF. As a specific example, parallel access volume (PAV) capability such as HyperPav is a HEF supported by z/OS. If the relevant CU loses knowledge of the HEF, HyperPav alias devices can get I/O errors and be marked unusable. In this circumstance, the operating system must recover these alias devices and redo HyperPav alias initialization.

Accordingly, it is an object of the present invention to provide a method and system to correctly and efficiently detect loss of CU knowledge of a host enabled facility while lessening or eliminating any additional overhead associated with unnecessary initialization processes.

SUMMARY

According to at least one embodiment, a method for determining whether a control unit for an attached device has lost knowledge of a host enabled facility associated with the attached device is implemented by one or more computing systems. The method comprises initiating a sequence of I/O instructions to the control unit that includes a first instruction to determine whether the control unit currently has knowledge of the host enabled facility and a second instruction providing knowledge of the host enabled facility by the control unit; based at least in part on one or more responses from the control unit to the sequence of I/O instructions, determining whether the control unit has transitioned from a first state in which the control unit does not have knowledge of the host enabled facility to a second state in which the control unit has knowledge of the host enabled facility; and, based at least in part on a determination that the control unit has transitioned from the first state to the second state as a result of the sequence of I/O instructions, initializing one or more parameters for use with the host enabled facility, and otherwise preventing the initializing of the one or more parameters.

According to another embodiment, a non-transitory computer-readable storage medium has stored contents that, when executed, configures a computing system to perform a method. The method comprises initiating a sequence of I/O instructions to the control unit that includes a first instruction to determine whether the control unit currently has knowledge of the host enabled facility and a second instruction providing knowledge of the host enabled facility by the control unit; based at least in part on one or more responses from the control unit to the sequence of I/O instructions, determining whether the control unit has transitioned from a first state in which the control unit does not have knowledge of the host enabled facility to a second state in which the control unit has knowledge of the host enabled facility; and, based at least in part on a determination that the control unit has transitioned from the first state to the second state as a result of the sequence of I/O instructions, initializing one or more parameters for use with the host enabled facility, and otherwise preventing the initializing of the one or more parameters.

According to another embodiment, a computing system comprises one or more processors and at least one memory that includes instructions that, upon execution by a processor, cause the computing system to perform a method. The method comprises initiating a sequence of I/O instructions to the control unit that includes a first instruction to determine whether the control unit currently has knowledge of the host enabled facility and a second instruction providing knowledge of the host enabled facility by the control unit; based at least in part on one or more responses from the control unit to the sequence of I/O instructions, determining whether the control unit has transitioned from a first state in which the control unit does not have knowledge of the host enabled facility to a second state in which the control unit has knowledge of the host enabled facility; and, based at least in part on a determination that the control unit has transitioned from the first state to the second state as a result of the sequence of I/O instructions, initializing one or more parameters for use with the host enabled facility, and otherwise preventing the initializing of the one or more parameters.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

DETAILED DESCRIPTION

Figure 1:
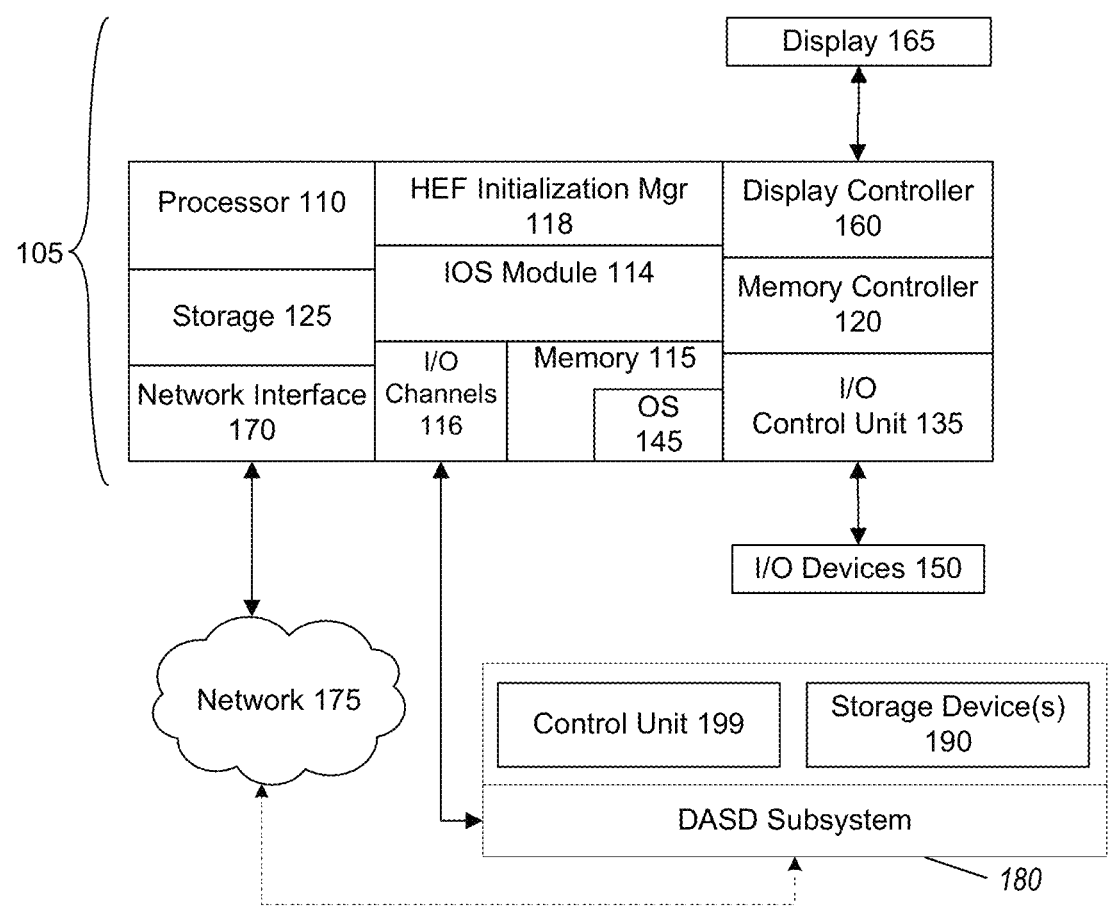
FIG. 1 depicts a block diagram of an exemplary network environment and computing system in accordance with an embodiment.

As used herein, the term "mount" refers to any process in which a device is brought online, or otherwise made available to an operating system and system applications; the term "dismount" refers to any process in which such a device is brought offline, or otherwise made unavailable to the OS and system applications. For example, mounting a device may include procedures associated with a "vary online" process or command under certain operating systems such as z/OS; conversely, dismounting a device may include a "vary offline" process or command under such operating systems. The term "losing the HEF," also as used herein, may refer to any scenario in which a control unit loses knowledge of a host enabled facility or parameters for that HEF that have been previously conveyed to the control unit; conversely, "having the HEF" refers to a scenario in which a control unit has knowledge of a host enabled facility and any conveyed parameters for that HEF. As used herein, the term "attached device" may refer to any I/O device that is communicatively coupled (e.g., via network attachment, SCSI attachment, or other communicative coupling) to a computing system with an I/O control unit—which may, in turn, be communicatively coupled to that computing system in such manner as well.

Various material herein related to parallel access volume support is described in U.S. Pat. No. 5,530,897, entitled "System for Dynamic Association of a Variable Number of Device Addresses with Input/Output Devices to Allow Increased Concurrent Requests for Access to the Input/Output Devices," and hereby incorporated by reference in its entirety.

In various examples herein, a host enabled facility (HEF) is exemplified by a parallel access volume capability such as HyperPav, via which each of a quantity of a DASD CU disk volumes (AKA logical volume) is permanently associated with a single unit address (UA, AKA device) that operates as the access point for I/O from a host system to the logical volume. This single unit address or "UA" may also be known as the "base device." In at least certain operating systems, I/O architecture allows only a single I/O at a time to a UA. As referenced herein at least with respect to DASD subsystems, a "CU" (AKA Logical Subsystem or "LSS") refers to a logical control unit. A DASD subsystem may contain many logical control units. Faster host processor speeds and larger logical volume sizes have created a need for multiple concurrent I/O instructions to a single logical volume. PAV support allows a CU to provide one or more "alias" UAs, which can be semi-statically associated with a logical volume to allow for additional concurrent I/O instructions. With HyperPav, the alias devices are treated as a pool that can be dynamically associated with any logical volume in the CU on demand.

It will be appreciated that all references herein to HyperPav (or more generally to parallel access volume capability) may also apply to additional host enabled facilities (HEFs) affected by device initialization, mounting, dismounting, etc.

Initialization of HyperPav aliases involves the host system issuing I/O instructions to each alias device to read the device's self-description information and including the alias in the host system's pool of aliases for the CU. Other I/O instructions are performed with respect to each alias to establish its paths in the path group. For base devices defined as online at initial program load (IPL), communication of the HEF to the CU and HyperPav alias initialization are done during that IPL process. Otherwise, for CUs with all base devices defined as offline at IPL or added later by dynamic I/O, this is done when the first base device in the CU is brought online. Typically, the mechanism used to initialize alias devices when bringing a device online (such as via a mount or vary online process) is to issue an I/O command to the CU to request the CU to present a State Change Interrupt (SCI) on each alias device in the CU. The SCIs cause the aliases to be initialized because the OS responds to a SCI on an alias by reading its self-description information and, if needed, establishing dynamic pathing. First time communication of the HEF to the CU and alias initialization may present no errors. However, in such circumstances problems may arise when the CU loses knowledge of the HEF.

When a host system brings a (base) device online, it issues I/O instructions to establish dynamic pathing at the device ("group" the device). When a device is brought offline, the host issues an I/O instruction to disband the path group ("ungroup" the device). One case where the CU is permitted to discard the HEF is whenever the host has no base devices "grouped". This may cause problems in various ways. As two examples, problems may arise when 1) bringing the last base device in the CU offline, and 2) removing a bad path from the path group for a device without accessing the bad path by disbanding the path group and then grouping the good paths ("disband/regroup"). If the device is the only grouped device in the CU at the moment when the disband I/O is issued, the CU may discard the HEF. Past approaches to handling these problems, and certain shortcomings associated with such approaches, are described below.

For instances in which the last base device in the CU is dismounted or otherwise brought offline, one past approach has been to initialize aliases or other configuration parameters each time any device in the CU is brought online. However, this approach can cause "flooding" or other severe system resource difficulties. For example, if every base device in the CU is brought online at the same time, each such device causes SCIs to be issued for every alias or other parameter relevant to the CU. This causes unnecessary overhead because alias initialization may be relatively resource intensive.

Another past approach for determining that loss of knowledge of a HEF has occurred when the last base device in the CU is brought offline is to maintain a flag for each CU to indicate whether all aliases have been initialized. When bringing a device online, the flag may be checked to determine whether to initialize all aliases. However, such flag becomes inaccurate in various circumstances. For example, if the flag is only set when the first device in the CU is brought online, then if all the devices are later brought offline, or the first attempt to bring a device online fails after the flag is set, a subsequent attempt to bring the device online will not cause the required reinitialization of aliases because the flag is already set. Alternatively, if the flag is reset whenever a device is brought offline (or whenever its path group is disbanded), flooding can occur in certain situations where many devices are serially brought offline and back online. Other past approaches with similar problems include maintaining a count of online devices in the CU, or determining a quantity of such online devices by scanning all unit control blocks (UCBs) representing a device in the CU. In each of these cases, the resulting determination is generally inaccurate.

For instances of disbanding and regrouping devices, typical solutions involve adding an additional I/O instruction to re-communicate the HEF to the CU as part of recovery processing. Such a solution typically adds both complexity and computing resource overhead.

The present disclosure provides systems and methods for detecting when a CU has lost knowledge of a supported HEF, allowing the HEF to be initialized only when necessary.

In at least some embodiments, when mounting a device I/O instructions are issued to allow the device support code to explicitly detect if a CU did not previously have knowledge of a supported HEF, but as a result of mounting the device now does. Only when this type of transition is detected is the HEF (along with aliases or other configuration parameters) reinitialized. In at least some embodiments, information from existing I/O instructions may be utilized without incurring additional resource overhead. In addition, in certain embodiments initialization is not performed until it is certain that the device will actually be brought online. In at least one embodiment, initialization is performed not by requesting SCIs but by explicitly processing each alias device in the CU to get its self-description information and, if needed, to establish dynamic pathing. Such approach may avoid errors resulting from a failure to initialize when needed, as well as excess overhead incurred by performing initialization when not required. In addition, "false starts" may be avoided later in processing a mount procedure if it is later determined that the device will not be brought online.

With respect to the HyperPav example, a number of advantages are associated with this approach. Because aliases are processed explicitly, while alias initialization is in progress for a CU any duplicate requests to initialize aliases for the same CU can be suppressed (since the transition from the CU not having knowledge of the HEF to having knowledge of the HEF is detected by issuing I/O commands, duplicate requests may occur if multiple devices in the CU are brought online concurrently). Additionally, excessive reinitialization of HyperPav aliases can be prevented by disallowing additional initialization requests for the same CU until a specified or predefined amount of time has elapsed. Furthermore, because aliases are processed explicitly, additional actions can be taken to correct any error conditions of the aliases.

For instances of I/O recovery involving the removal of a bad path from a device by disbanding the path group and re-grouping the good paths, possible loss of the HEF by the CU (for any reason) may be detected when I/O supervisor (IOS) recovery observes certain error conditions for an alias device. When it is deemed likely that the CU has lost the HEF, HyperPav aliases are initialized. When it is less certain, an I/O instruction is issued to explicitly check if the CU has lost the HEF. If the check shows that the CU has lost the HEF, HyperPav aliases are initialized. This avoids unneeded I/O instructions during IOS recovery processing, and avoids unnecessary alias initialization by limiting the overhead to a single I/O. Furthermore, because the check is done explicitly, while it is in progress, any duplicate requests to check if the same CU has lost the HEF can be suppressed. (Duplicate requests can occur when multiple devices undergo IOS recovery processing concurrently.) As above, duplicate requests to initialize HyperPav aliases for the same CU can be suppressed. Also as above, additional actions can be taken to correct any error conditions of the aliases.

FIG. 1 illustrates a block diagram of a networked computing system 100 for use in practicing the teachings herein. The methods described herein can be performed or otherwise implemented via hardware, software (e.g., firmware), or combination thereof. In an exemplary embodiment, the methods described herein are implemented in hardware, and may be part of the microprocessor of a special or general-purpose digital computer, such as a personal computer, workstation, minicomputer, or mainframe computer. The computing system 100 therefore includes computer 105.

In the illustrated embodiment of FIG. 1, the computer 105 includes a general processor 110, an HEF initialization manager module 118, an I/O supervisor (IOS) module 114, a memory 115 coupled to a memory controller 120, internal storage 125, and one or more input and/or output (I/O) devices 150 that are communicatively coupled to the computer 105 via I/O control unit 135. One or more of the I/O devices 150 may, in certain embodiments, be incorporated within the computer 105. The I/O Control Unit 135 may include one or more buses or other wired or wireless connections, as is known in the art. The I/O Control Unit 135 may, in certain embodiments, reside outside the computer and be communicatively coupled to the computer via I/O channels or via a network. In addition, it may further include additional elements, which are omitted for simplicity, such as controllers, buffers (caches), drivers, repeaters, and receivers, to facilitate communications. Further, the local interface may include address, control, and/or data connections to facilitate appropriate communications among the aforementioned components. In the illustrated embodiment, the computer 105 is communicatively coupled via I/O channels 116 to an attached DASD subsystem 180 that includes a Control Unit 199 and one or more storage devices 190. In other embodiments, the DASD subsystem 180 may be a network-attached subsystem that is communicatively coupled to the computer 105 via a network interface 170 and network 175.

Also in the illustrated embodiment, the processor 110 is a hardware device for executing hardware instructions or software, particularly that stored in memory 115. The processor 110 can be any custom made or commercially available processor, a central processing unit (CPU), an auxiliary processor among several processors associated with the general-purpose computer 105, a semiconductor based microprocessor (in the form of a microchip or chip set), a macroprocessor, or generally any device for executing instructions.

The memory 115 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 115 may incorporate electronic, magnetic, optical, and/or other types of storage media. Note that the memory 115 can have a distributed architecture, where various components are situated remote from one another, but can be accessed by the processor 110.

The instructions in the memory 115 may include one or more separate programs, each of which comprises an ordered listing of executable instructions for implementing logical functions. In the example of FIG. 1, the instructions in the memory 115 include a suitable operating system (OS) 145, such as z/OS. The operating system 145 typically controls the execution of other computer programs and may, among other capabilities, provide scheduling, input-output control, file and data management, memory management, and communication control and related services.

In an exemplary embodiment, I/O devices 150 may include, as non-limiting examples, a keyboard, mouse, printer, scanner, microphone, a network interface card (NIC) or modulator/demodulator (for accessing other files, devices, systems, or a network), a radio frequency (RF) or other transceiver, a telephonic interface, a bridge, a router, and other peripherals communicatively coupled to the computer 105 via I/O Control Unit 135. In the depicted embodiment, the computing system 100 further includes a display controller 160 coupled to a display 165, and a network interface 170 communicatively coupled to a network 175. The network 175 may be an IP-based network for communication between computer 105 and any external server, client and the like via a broadband or other network connection. The network 175 transmits and receives data between the computer 105 and external systems. In an exemplary embodiment, the network 175 may be a managed IP network administered by a service provider. The network 175 may be implemented in a wireless fashion, e.g., using wireless protocols and technologies, such as WiFi, WiMax, etc. The network 175 may also be a packet-switched network such as a local area network, wide area network, metropolitan area network, Internet network, or other similar type of network environment. The network 175 may be a fixed wireless network, a wireless local area network (LAN), a wireless wide area network (WAN) a personal area network (PAN), a virtual private network (VPN), intranet or other suitable network system and includes equipment for receiving and transmitting signals.

In at least some embodiments, the memory 115 may further include a basic input output system (BIOS) (omitted for simplicity). The BIOS is a set of routines that initialize and test hardware at startup, initiate execution of the OS 145, and support the transfer of data among the hardware devices. The BIOS is typically stored in ROM so that the BIOS may be executed when the computer 105 is activated. When the computer 105 is in operation, the processor 110 is configured to execute instructions stored within the memory 115, to communicate data to and from the memory 115, and to generally control operations of the computer 105 pursuant to the instructions.

Figure 2:
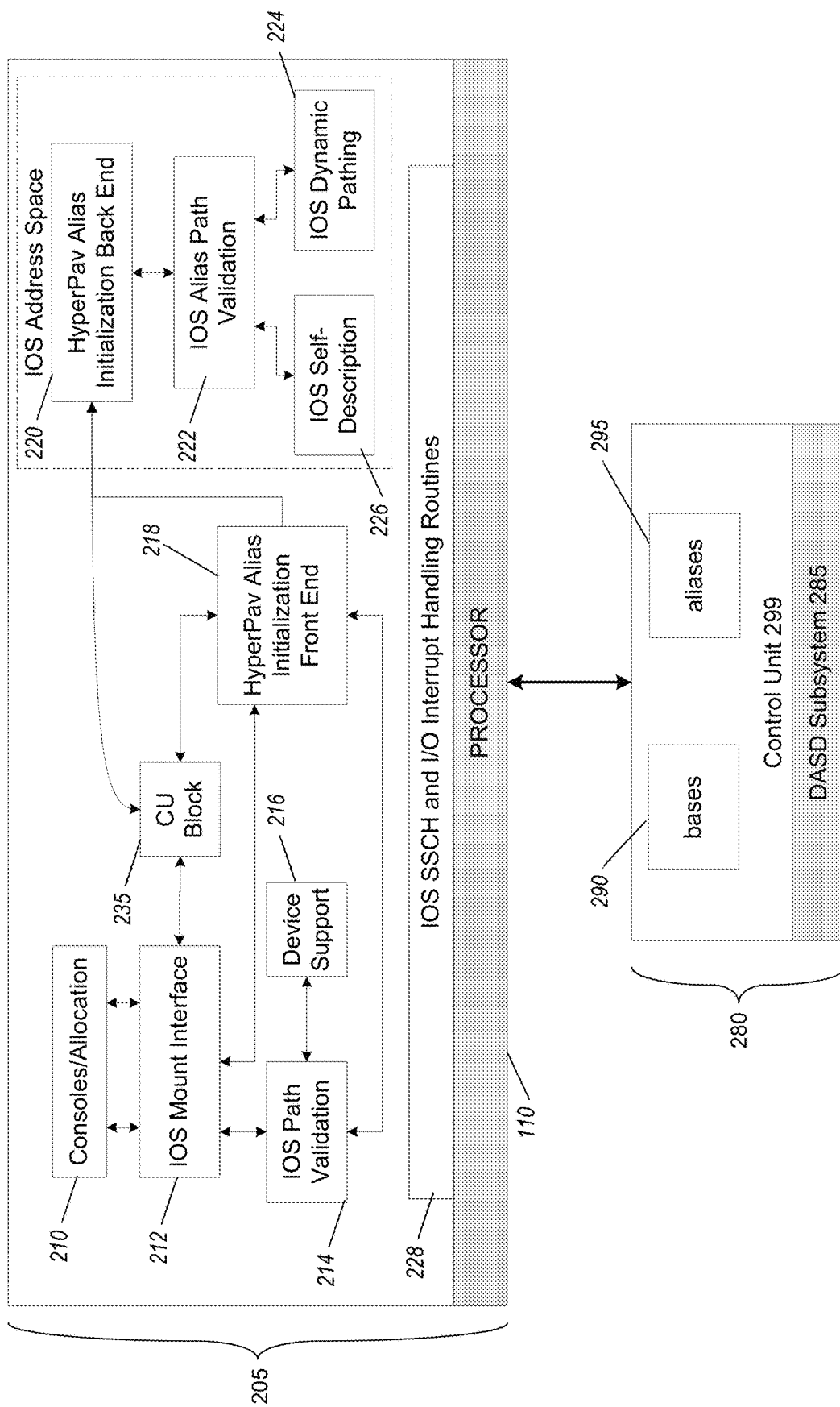
FIG. 2 depicts a block diagram illustrating interactions and components suitable for performing at least some techniques described in the present disclosure.

FIG. 2 depicts a block diagram illustrating interactions and components suitable for initialization of HyperPav aliases in a CU during device mount processing in accordance with techniques described herein. In the depicted embodiment, a z/OS system 205 includes a CU Block data structure 235 that contains data pertaining to a CU 299 that is part of a DASD subsystem 285. The CU 299 includes base devices 290 and HyperPav aliases 295. The exemplary procedure is as follows:

Consoles/Allocation 210 receives a 'vary device online' or other mount command for a DASD in a CU with HyperPav aliases.

Consoles/Allocation 210 invokes the IOS mount interface module 212 to verify the paths to the device.

The IOS mount interface module 212 calls IOS path validation module 214 to perform the processing.

IOS path validation module 214 invokes DASD device support code 216 with a parameter list (not shown) to perform device dependent online processing, which is a series of calls and returns in which the DASD device support code returns a series of channel programs for the IOS path validation routine to issue and return the output to the DASD device support code. In the depicted embodiment, such processing includes issuing to the DASD subsystem 285 a sequence of I/O instructions that include (a) Read Device Characteristics (RDC), such that data returned includes a flag indicating whether the CU has the HEF; (b) Perform Subsystem Function (PSF) Set System Characteristics (SSC) order, communicating the HEF to the CU; and (c) again perform RDC.

The device support code module 216 compares the results from I/O instructions a and c. If the CU transitioned from not having the HEF to having the HEF, the device support code module sets on a new flag in the parameter list. When the new flag is set on, IOS path validation module 214 invokes the new HyperPav Alias Initialization Front End module ("Front End") 218 to set the flag indicating that aliases need to be initialized for the CU.

The Front End 218 sets on a new flag in the IOS Control Unit Block (CU Block, which represents a CU) 235, indicating that aliases need to be initialized and returns control to IOS path validation module 214.

The IOS path validation 214 returns control to the IOS mount interface module 212, which returns control to Consoles/Allocation module 210/Allocation.

Consoles/Allocation module 210 completes vary device online processing to a point right before marking the device online.

Consoles/Allocation module 210 invokes the IOS Mount interface 212 module to notify IOS that the device is actually coming online.

The IOS Mount interface 212 module invokes the Front End 218 to initialize the aliases, if needed.

The Front End 218 checks if the CU Block flag is on to determine whether aliases need to be initialized, whether a new CU Block flag indicating alias initialization in progress is off, and (in the depicted embodiment) whether less than one minute has elapsed since the last time that the aliases were initialized (saved in a new time stamp in the CU Block). If all three conditions are met, the Front End sets on the CU Block flag indicating alias initialization is in progress and schedules the new HyperPav Alias Initialization Back End module ("Back End") 220 to perform the initialization asynchronously.

The Front End 218 returns control to the IOS Mount interface 212 module, which returns control to Consoles/Allocation module 210. Consoles/Allocation marks the UCB for the base device 290 as being online and completes mount processing.

The Back End 220 initializes the aliases in the CU by (a) issuing the PSF SSC I/O on the base device 290 to communicate the HEF to the CU (in case something happened to cause the CU to lose the HEF before the Back End initiated the routine to initialize aliases); (b) serially calling IOS alias path validation processing 222 for each alias in the CU to read the self-description information 226, establish dynamic pathing 224 if needed, and add the alias to the CU pool; (c) if alias initialization succeeded, updating the time stamp of the last alias initialization for this CU in the CU Block and turning off the CU Block flag indicating that the aliases need to be initialized; and (d) turning off the CU Block flag indicating that alias initialization is in progress.

It will be appreciated that when no base devices are mounted, the CU might not have the HEF, but that such absence may have no effect because a base device must be online in order to use HyperPav aliases. When one or more base devices are online and the CU has knowledge of the HEF and initialization has been performed for any associated aliases or other configuration parameters, HEF initialization of such parameters is unnecessary to perform mount processing for another base device. Thus, aliases and/or other HEF configuration parameters only need to be initialized when bringing a device online causes the CU to transition from not having knowledge of the HEF to having such knowledge.

In one embodiment, initialization of the HyperPav aliases in a CU when IOS recovery (not shown for clarity) detects that the CU may have lost the HEF is performed in two cases, as follows.

The first case in which initialization is performed based on a likelihood that the CU has lost the HEF is when an application I/O is performed using a HyperPav alias and returns one or more of a subset of errors that can occur when the CU has lost the HEF. In this case, HyperPav aliases have been initialized and are in use; the returned error therefore indicates a likelihood that the CU has lost the HEF. The aliases are therefore reinitialized as follows:

IOS recovery executing during IOS interrupt processing 228 invokes the Front End 218 to set on the CU Block flag indicating the CU's aliases need to be initialized.

The Front End 218 sets on the flag and returns.

IOS recovery executing during IOS interrupt processing 228 invokes the Front End 218 to initialize the aliases.

The Front End 218 makes the checks and schedules the Back End 220 to perform the initialization, as above, and returns.

The second case in which initialization is performed based on a likelihood that the CU has lost the HEF is when IOS recovery (not shown) processes an alias and finds that there are no good paths and an error has occurred. In this case, it is less certain that the CU lost the HEF (IOS recovery is invoked for various error conditions), so in at least some embodiments a check for loss of HEF is performed before initializing the aliases, as follows:

IOS recovery, executing independently of IOS interrupt processing, invokes the Front End 218 to determine whether the CU lost the HEF and, if so, to reinitialize the aliases ("check and initialize").

If a new CU Block flag (indicating that check and initialize is in progress) is off, the Front End 218 sets that flag on and schedules the Back End 220 to do the check and initialize processing asynchronously.

The Front End 218 returns to IOS recovery.

The Back End 220 issues the RDC I/O instruction for a base device.

If the RDC indicates the CU does not have the HEF, the Back End 220 invokes the Front End 218 twice (as above) so that a new instance of the Back End 220 is scheduled to initialize the relevant aliases.

The Back End 220 turns off the CU Block flag (indicating that check and initialize is no longer in progress).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be appreciated that in some embodiments the functionality provided by the routine or routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that particular data structures discussed above may be structured in different manners, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for determining whether a control unit for an attached device has lost knowledge of a host enabled facility associated with the attached device, the method comprising:
   initiating a sequence of I/O instructions to the control unit that includes a first instruction to determine whether the control unit currently has knowledge of the host enabled facility and a second instruction to provide knowledge of the host enabled facility to the control unit by reinitializing the host enabled facility on the control unit, wherein the host enabled facility is a storage configuration that was previously known to and utilized by the control unit;
   based at least in part on one or more responses from the control unit to the sequence of I/O instructions, determining whether the control unit has transitioned from a first state in which the control unit does not have knowledge of the host enabled facility to a second state in which the control unit has knowledge of the host enabled facility; and
   based at least in part on a determination that the control unit has transitioned from the first state to the second state as a result of the sequence of I/O instructions, initializing one or more parameters for use with the host enabled facility, and otherwise preventing the initializing of the one or more parameters.

2. The computer-implemented method of claim 1 wherein the attached device is a storage device, wherein the host enabled facility is a parallel access volume support facility, and wherein the one or more parameters include one or more aliases for use in accessing the attached device.

3. The computer-implemented method of claim 1 wherein the method is performed in response to an instruction to mount the attached device for use by the control unit.

4. The computer-implemented method of claim 1 wherein the sequence of I/O instructions includes two or more identical instructions to read one or more characteristics of the attached device.

5. The computer-implemented method of claim 1, further comprising determining whether the attached device is to be brought online and, responsive to such determining, delaying initializing of the one or more parameters until the attached device is to be brought online.

6. The computer-implemented method of claim 1, wherein determining whether the control unit has transitioned from the first state to the second state includes determining that the control unit is likely to have transitioned, and wherein initializing the one or more parameters for use with the host enabled facility is performed in response to such determining.

7. The computer-implemented method of claim 1 wherein initializing the one or more parameters for use with the attached device includes setting one or more flags to prevent an additional performance of the method during the initializing.

8. A non-transitory computer-readable medium having stored contents that, when executed, configure a computing system to perform a method for determining whether a control unit for an attached device has lost knowledge of a host enabled facility associated with the attached device, the method comprising:
   initiating a sequence of I/O instructions to the control unit that includes a first instruction to determine whether the control unit currently has knowledge of the host enabled facility and a second instruction to provide knowledge of the host enabled facility by the control unit by reinitializing the host enabled facility on the control unit, wherein the host enabled facility is a storage configuration that was previously known to and utilized by the control unit;
   based at least in part on one or more responses from the control unit to the sequence of I/O instructions, determining whether the control unit has transitioned from a first state in which the control unit does not have knowledge of the host enabled facility to a second state in which the control unit has knowledge of the host enabled facility; and based at least in part on a determination that the control unit has transitioned from the first state to the second state as a result of the sequence of I/O instructions, initializing one or more parameters for use with the host enabled facility, and otherwise preventing the initializing of the one or more parameters.

9. The non-transitory computer-readable medium of claim 8 wherein the attached device is a storage device, wherein the host enabled facility is a parallel access volume support facility, and wherein the one or more parameters include one or more aliases for use in accessing the attached device.

10. The non-transitory computer-readable medium of claim 8 wherein the stored contents further configure the computing system to perform the method in response to an instruction to mount the attached device for use by the control unit.

11. The non-transitory computer-readable medium of claim 8 wherein the sequence of I/O instructions includes two or more identical instructions to read one or more characteristics of the attached device.

12. The non-transitory computer-readable medium of claim 8, wherein the stored contents further configure the computing system to determine whether the attached device is to be brought online and, responsive to such determining, to delay initialization of the one or more parameters until the attached device is to be brought online.

13. The non-transitory computer-readable medium of claim 8, wherein determining whether the control unit has transitioned from the first state to the second state includes determining that the control unit is likely to have transitioned, and wherein the stored contents further configure the computing system to initialize the one or more parameters for use with the host enabled facility is performed in response to such determining.

14. The non-transitory computer-readable medium of claim 8 wherein initializing the one or more parameters for use with the attached device includes setting one or more flags to prevent an additional performance of the method during the initializing.

15. A system for determining whether a control unit for an attached device has lost knowledge of a host enabled facility associated with the attached device, comprising:
one or more processors; and
at least one memory, the memory including instructions that, upon execution by at least one of the one or more processors, cause the system to perform a method, the method including:

initiating a sequence of I/O instructions to the control unit that includes a first instruction to determine whether the control unit currently has knowledge of the host enabled facility and a second instruction to provide knowledge of the host enabled facility by the control unit by reinitializing the host enabled facility on the control unit, wherein the host enabled facility is a storage configuration that was previously known to and utilized by the control unit;

based at least in part on one or more responses from the control unit to the sequence of I/O instructions, determining whether the control unit has transitioned from a first state in which the control unit does not have knowledge of the host enabled facility to a second state in which the control unit has knowledge of the host enabled facility; and based at least in part on a determination that the control unit has transitioned from the first state to the second state as a result of the sequence of I/O instructions, initializing one or more parameters for use with the host enabled facility, and otherwise preventing the initializing of the one or more parameters.

16. The system of claim 15 wherein the attached device is a storage device, wherein the host enabled facility is a parallel access volume support facility, and wherein the one or more parameters includes one or more aliases for use in accessing the attached device.

17. The system of claim 15 wherein the instructions cause the system to perform the method in response to an instruction to mount the attached device for use by the control unit.

18. The system of claim 15 wherein the sequence of I/O instructions includes two or more identical instructions to read one or more characteristics of the attached device.

19. The system of claim 15, wherein the method further comprises determining whether the attached device is to be brought online and, responsive to such determining, delaying initializing of the one or more parameters until the attached device is to be brought online.

20. The system of claim 15, wherein determining whether the control unit has transitioned from the first state to the second state includes determining that the control unit is likely to have transitioned, and wherein the instructions cause the system to initialize the one or more parameters for use with the host enabled facility in response to such determining.

* * * * *